US010736055B2

United States Patent
Rahman et al.

(10) Patent No.: US 10,736,055 B2
(45) Date of Patent: *Aug. 4, 2020

(54) TRANSMIT POWER CONTROL OF A MOBILE TERMINAL IN A DUAL CONNECTIVITY MODE

(71) Applicant: Telefonaktiebolaget LM Ericsson (publ), Stockholm (SE)

(72) Inventors: Imadur Rahman, Sollentuna (SE); Ali Behravan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,294

(22) Filed: Aug. 16, 2017

(65) Prior Publication Data

US 2017/0347327 A1    Nov. 30, 2017

Related U.S. Application Data

(63) Continuation of application No. 14/904,756, filed as application No. PCT/SE2014/050931 on Aug. 11, 2014, now Pat. No. 9,756,586.
(Continued)

(51) Int. Cl.
*H04W 52/36* (2009.01)
*H04W 52/24* (2009.01)
(Continued)

(52) U.S. Cl.
CPC .......... *H04W 52/36* (2013.01); *H04W 52/16* (2013.01); *H04W 52/246* (2013.01);
(Continued)

(58) Field of Classification Search
CPC ............. H04W 52/146; H04W 52/246; H04W 52/281; H04W 52/346; H04W 52/36; H04W 52/362
(Continued)

(56) References Cited

U.S. PATENT DOCUMENTS 9,756,586 B2 *   9/2017   Rahman ............... H04W 52/246
2011/0275403 A1  11/2011  Chen
(Continued)

FOREIGN PATENT DOCUMENTS

CN    102308610 A    1/2012
GB      2498758 A    7/2013
(Continued)

OTHER PUBLICATIONS

Ericsson, "Considerations on power control for Dual Connectivity", 3GPP TSG-RAN WG2 #84, San Francisco, US, Nov. 11, 2013, pp. 1-4, Tdoc R2-134234, 3GPP.
(Continued)

*Primary Examiner* — Philip Sobutka
(74) *Attorney, Agent, or Firm* — Coats & Bennett PLLC

(57) ABSTRACT

Embodiments herein relate to a method for controlling transmit power of a mobile terminal. The method is performed by a mobile terminal in a dual connectivity mode wherein the mobile terminal is configured to support two or more contemporaneous links, including a first link and a second link, with two or more wireless network access points. The mobile terminal independently calculates a respective unscaled uplink transmission power level for each link, based on a corresponding link-specific value. The mobile terminal calculates a respective scaling factor for each link based on a total-power constraint and on one or more of the following: uplink resource allocation to each link, such that the scaling factor for the first link allocated
(Continued)

more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link. The mobile terminal further applies the respective scaling factor to each respective unscaled uplink transmission power level, to obtain corresponding scaled power levels. The mobile terminal furthermore transmits over the two or more contemporaneous links at the respective scaled power levels.

30 Claims, 13 Drawing Sheets

Related U.S. Application Data

(60) Provisional application No. 61/863,937, filed on Aug. 9, 2013.

(51) Int. Cl.
  *H04W 52/34* (2009.01)
  *H04W 52/16* (2009.01)
  *H04W 52/28* (2009.01)
  *H04W 52/14* (2009.01)

(52) U.S. Cl.
  CPC ....... *H04W 52/281* (2013.01); *H04W 52/362* (2013.01); *H04W 52/146* (2013.01); *H04W 52/346* (2013.01); *H04W 52/367* (2013.01)

(58) Field of Classification Search
  USPC ....................................................... 455/522
  See application file for complete search history.

(56) References Cited

U.S. PATENT DOCUMENTS

| | | | |
|---|---|---|---|
| 2012/0082043 A1 | 4/2012 | Hwang et al. | |
| 2013/0272231 A1* | 10/2013 | Dinan ................. | H04W 52/34 370/329 |
| 2014/0192740 A1 | 7/2014 | Ekpenyong et al. | |
| 2015/0264666 A1* | 9/2015 | Yi ....................... | H04W 76/046 370/329 |

FOREIGN PATENT DOCUMENTS

| | | |
|---|---|---|
| WO | 2013025562 A2 | 2/2013 |
| WO | 2014109136 A1 | 7/2014 |
| WO | 2014109687 A1 | 7/2014 |

OTHER PUBLICATIONS

Ericsson, "Power control on dual connectivity", 3GPP TSG RAN WG1 Meeting #76, Prague, Czech Republic, Feb. 10, 2014, pp. 1-2, R1-140762, 3GPP.

3rd Generation Partnership Project, "LTE Release 12 and Beyond", 3GPP RAN WS on Rel-12 and onwards, Ljubljana, Slovenia, Jun. 11, 2012, pp. 1-10, RWS-120003, 3GPP.

Ericsson, et al., "Initial considerations on Heterogeneous Networks for UMTS", 3GPP TSG RAN WG1 Meeting #70bis, San Diego, CA, USA, Oct. 8, 2012, pp. 1-7, R1-124512, 3GPP.

Huawei, et al., "Proposed SID: Study on UMTS Heterogeneous Networks", TSG RAN Meeting #57, Chicago, USA, Sep. 4, 2012, pp. 1-5, RP-121436, 3GPP.

Ericsson, et al., "Heterogeneous Network Deployment Scenarios", 3GPP TSG-RAN WG1 #70bis, San Diego, CA, USA, Oct. 8, 2012, pp. 1-3, R1-124513, 3GPP.

3rd Generaton Partneship Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.3.0, Jun. 1, 2013, pp. 1-176, 3GPP, France.

* cited by examiner

TRANSMIT POWER CONTROL OF A MOBILE TERMINAL IN A DUAL CONNECTIVITY MODE

RELATED APPLICATIONS

This application is a continuation of U.S. application Ser. No. 14/904,756, filed Jan. 13, 2016, which was the National Stage of International Application No. PCT/SE2014/050931, filed Aug. 11, 2014, which claims the benefit of U.S. Provisional Application No. 61/863,937, filed Aug. 9, 2013, the disclosures of each of which are incorporated herein by reference in their entirety.

TECHNICAL FIELD

The present disclosure is directed to wireless communications and, more particularly, to addressing techniques for controlling transmission power in dual-connectivity scenarios.

BACKGROUND

In a typical cellular radio system also referred to as wireless communication network, wireless terminals, also referred to as user equipment, UEs, mobile terminals, and/or mobile stations, communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station, also referred to as a base station, a RAN node, a "NodeB", and/or enhanced NodeB "eNodeB". A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, Wideband Code-Division Multiple Access (WCDMA), High-Speed Packet Access (HSPA), and Long Term Evolution (LTE) wireless technologies. Moreover, fueled by the introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired. Techniques to improve downlink performance may include 4-branch Multiple Input Multiple Output (MIMO), multiflow communication, multi carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed for 3GPP as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GPP TSG RAN WG1 Meeting #70bis, San Diego, Calif., USA, 8-12 Oct. 2012; and R1-124513, Heterogeneous Network Deployment Scenarios, Ericsson, ST-Ericsson, 3GPP TSG-RAN WG1 #70bis, San Diego, Calif., USA, 8-12 Oct. 2012.

A homogeneous network is a network of base stations, also referred to as NodeB's, enhanced NodeB's, or eNBs, in a planned layout, providing communications services for a collection of mobile terminals in which all base stations may have similar transmit power levels, antenna patterns, receiver noise floors, and/or backhaul connectivity to the data network. Moreover, all base stations in a homogeneous network may offer unrestricted access to mobile terminals in the network, and each base station may serve roughly a same number of mobile terminals. Current cellular wireless communications systems in this category may include, for example, Global System for Mobile communication (GSM), WCDMA, High Speed Downlink Packet Access (HSDPA), LTE, Worldwide Interoperability for Microwave Access (WiMAX), etc. In a heterogeneous network, low power base stations, also referred to as low power nodes (LPN), micro nodes, pico nodes, femto nodes, relay nodes, remote radio unit (RRU) nodes, small cells, RRUs, etc. may be deployed along with or as an overlay to planned and/or regularly placed macro base stations. A macro base station (MBS) may thus provide service over a relatively large macro cell area and each LPN may provide service for a respective relatively small LPN cell area within the relatively large macro cell area. Power transmitted by an LPN, e.g., 2 Watts, may be relatively small compared to power transmitted by a macro base station, e.g., 40 Watts for a typical MBS. An LPN may be deployed, for example, to reduce/eliminate a coverage hole(s) in the coverage provided by the MBS, and/or to off-load traffic from macro base stations, e.g., to increase capacity in a high traffic location, also referred to as a hot-spot. Due to the lower transmit power and smaller physical size, an LPN may offer greater flexibility for site acquisition.

In initial discussions among members of the $3^{rd}$-Generation Partnership Project (3GPP) regarding the development of Release 12 specifications for LTE, one of the proposed items for study is the possibility of simultaneously serving a mobile terminal from more than one eNB. In the disclosure that follows, this is called "dual connectivity." The control plane procedures of LTE have to be updated in order to support this dual connectivity.

Dual connectivity is a feature defined from the mobile terminal perspective, whereby the mobile terminal may simultaneously receive and transmit to at least two different network points. Dual connectivity is defined for the case when the aggregated network points operate on the same or separate/different frequencies. Each network point that the mobile terminal is aggregating may define a stand-alone cell or it may not define a stand-alone cell. It is further foreseen that from the mobile terminal perspective, the mobile terminal may apply some form of Time Division Multiplexing (TDM) scheme between the different network points that the mobile terminal is aggregating in some scenarios, e.g. a scenario where the mobile terminal has less number of transmitter (TX) or receiver (RX) chains compared to the number of nodes it is connected to. This implies that the communication on the physical layer to and from the different aggregated network points may not be truly simultaneous in some scenarios. Thus, rather than purely simultaneous communications, dual connectivity may be regarded as providing support for contemporaneous communications with multiple independent network points, where "contemporaneous" should be understood as referring to events or things occurring or existing during the same period of time, where the periods of time relevant here are time periods relevant to wireless communications, i.e., on the scale of transmission time intervals, communications frame times, round-trip times, etc. The independence of the network points are understood as unrelated time sequences between nodes, e.g. unsynchronized subframe and frame time boundaries, etc.

Dual connectivity as a feature bears many similarities with carrier aggregation and coordinated multipoint (CoMP) communication, which are also technology areas undergoing rapid development in 3GPP and elsewhere. A main differentiating factor between dual connectivity and these other technologies is that dual connectivity does not require stringent synchronization between the wireless network access points and accommodates relaxed backhaul communication requirements. Besides, all the control plane processes, e.g. Automatic Repeat-reQuest (ARQ) signalling, radio link monitoring, signalling, etc. are completely independent with respect to the wireless network access points. For example, in dual connectivity mode, there will be one primary cell in both wireless network access points, thus the control plane will be terminated in separate wireless network access points. In this way, not only the data place, the control plane is also independent in dual connectivity. This is in contrast to carrier aggregation and CoMP, where tight synchronization and a low-delay backhaul are assumed between connected wireless network access points. The mobile terminal with dual connectivity may in some cases not have enough power to transmit to both wireless network access points leading to a reduced performance of the wireless communication network.

SUMMARY

An objective of embodiments herein is to provide a mechanism that improves performance of a wireless communication network using dual connectivity.

According to embodiments herein the objective is achieved by providing a method performed by a mobile terminal for controlling transmit power of the mobile terminal in a dual connectivity mode, wherein the mobile terminal is configured to support two or more contemporaneous links, including a first link and a second link, with two or more wireless network access points. The mobile terminal independently calculates a respective unscaled uplink transmission power level for each link, based on a corresponding link-specific value. The mobile terminal further calculates a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link. The mobile terminal furthermore applies the respective scaling factor to each respective unscaled uplink transmission power level, to obtain corresponding scaled power levels. The mobile terminal transmits over the two or more contemporaneous links at the respective scaled power levels.

According to another aspect the objective is achieved by providing a method for controlling transmit power of a mobile terminal. The method is performed by a first wireless access point of two or more wireless network access points communicating with a mobile terminal in dual connectivity mode, wherein the mobile terminal is configured to support two or more contemporaneous links, including a first link and a second link, with the two or more wireless network access points. The first wireless network access point receives, from a second one of the two or more wireless network access points, one or more power control parameters for the mobile terminal. The first wireless network access point performs uplink power control for uplink transmissions from the mobile terminal in dual connectivity mode, based on the received one or more power control parameters.

A mobile terminal is herein provided for controlling transmit power of the mobile terminal in dual connectivity mode wherein the mobile terminal is configured to support two or more contemporaneous links, including a first link and a second link, with two or more wireless network access points. The mobile terminal is configured to independently calculate a respective unscaled uplink transmission power level for each link, based on a corresponding link-specific value. The mobile terminal is further configured calculate a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link. The mobile terminal is configured to apply the respective scaling factor to each respective unscaled uplink transmission power level, to obtain corresponding scaled power levels. Furthermore, the mobile terminal is configured to transmit over the two or more contemporaneous links at the respective scaled power levels.

In addition it is herein provided a first wireless network access point of two or more wireless network access points configured to communicate with a mobile terminal in dual connectivity mode for controlling transmit power of the mobile terminal. The mobile terminal in dual connectivity mode is configured to support two or more contemporaneous links, including a first and a second link, with the two or more wireless network access points. The first wireless network access point is configured to receive from a second wireless network access point one or more power control parameters for the mobile terminal. The first wireless network access point is further configured to perform uplink power control for uplink transmissions from the mobile terminal in dual connectivity mode, based on the received one or more power control parameters.

By using the scaling factors based on the described features the mobile terminal is able to transmit to both wireless network access points in an efficient manner leading to an improved performance of the wireless communication network.

DETAILED DESCRIPTION

Figure 1:
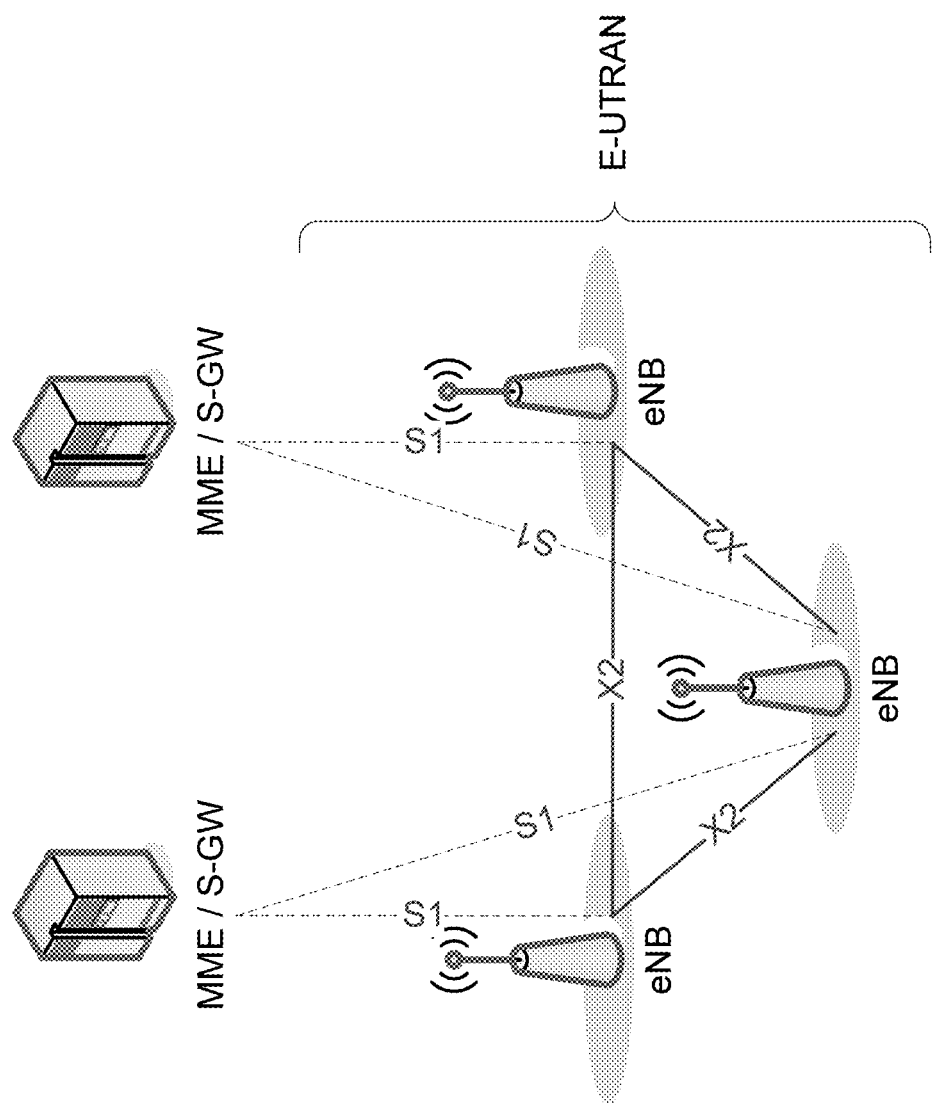
FIG. 1 is a schematic/block diagram illustrating the overall E-UTRAN architecture.

Embodiments herein will now be described more fully with reference to the accompanying drawings, in which examples of embodiments are shown. Claimed solution may, however, be embodied in many different forms and should not be construed as limited to the embodiments set forth herein. Rather, these embodiments are provided so that this disclosure will be thorough and complete. It should also be noted that these embodiments are not mutually exclusive. Components from one embodiment may be tacitly assumed to be present or used in another embodiment.

For purposes of illustration and explanation only, these and other embodiments of present embodiments are described herein in the context of operating in a Radio Access Network (RAN) that communicates over radio communication channels with mobile terminals, also referred to as wireless terminals or UEs. It will be understood, however, that embodiments herein are not limited to such embodiments and may be embodied generally in any type of communication network. As used herein, a mobile terminal may include any device that receives data from a communication network, and may include, but is not limited to, a mobile telephone, "cellular" telephone, smart phone, laptop/portable computer, tablet, pocket computer, hand-held computer, desktop computer, a machine to machine (M2M) or Machine Type Communications (MTC) type device, a sensor with a wireless communication interface, etc.

In some embodiments of a RAN, several base stations may be connected, e.g., by landlines or radio channels, to a Radio Network Controller (RNC). The RNC, also sometimes termed a Base Station Controller (BSC), may supervise and coordinate various activities of the plural base stations connected thereto. The radio network controller may be connected to one or more core networks. According to some other embodiments of the RAN, base stations may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for mobile terminals.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The E-UTRAN comprises the Long Term Evolution (LTE) and System Architecture Evolution (SAE). Note that although terminology from LTE is used in this disclosure to exemplify embodiments herein, this should not be seen as limiting the scope of the embodiments to only these systems. Other wireless systems, including 3GPP WCDMA, Worldwide Interoperability for Microwave Access (WMAX), Ultra Mobile Broadband (UMB), High-Speed Downlink Packet Access (HSDPA), GSM, etc., may also benefit from exploiting embodiments disclosed herein.

Also note that terminology such as base station, also referred to as NodeB, eNodeB, or Evolved Node B, and mobile terminal, also referred to as User Equipment node or UE, should be considering non-limiting and does not imply a certain hierarchical relation between the two. In general, a base station and a mobile terminal may each be considered an example of respective different communications devices that communicate with each other over a wireless radio channel. Furthermore, although the description below focuses, for purposes of illustration, on example embodiments in which described solutions are applied in heterogeneous networks that include a mix of relatively higher-power, e.g., "macro", base stations and relatively lower-power node, e.g., "pico", base stations, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as LTE, especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks as mentioned above where the traditional pre-planned macro base stations, known as the macro layer, are complemented with several low-powered base stations that may be deployed in a relatively unplanned manner. The 3GPP has incorporated the concept of Heterogeneous Networks as one of the core items of study in the latest enhancements of LTE, such as LTE release 11, and several low-powered base stations to realize heterogeneous networks such as pico base stations, femto base stations, also known as home base stations or HeNBs, relays, and remote radio heads (RRH) have been defined.

Initial discussions for LTE release 12 have begun, and one of the proposed items for study is the possibility of serving a mobile terminal from more than one base station or independent base station, simultaneously, or at least contemporaneously. The current legacy handover mechanisms of LTE may have to be updated to support this.

The E-UTRAN includes base stations called enhanced NodeBs (eNBs or eNodeBs), providing the E-UTRA user plane and control plane protocol terminations towards the mobile terminal. The base stations are interconnected with each other using the X2 interface. The base stations are also connected using the S1 interface to the Evolved Packet Core (EPC), more specifically to a Mobility Management Entity (MME) by means of the S1-MME interface and to a Serving Gateway (S-GW) by means of the S1-U interface. The S1 interface supports many-to-many relation between MMEs/S-GWs and base stations. The E-UTRAN architecture is illustrated in FIG. 1.

The base station hosts functionalities such as Radio Resource Management (RRM), radio bearer control, admission control, header compression of user plane data towards serving gateway, and/or routing of user plane data towards the S-GW. The MME is a control node that processes the signaling between the mobile terminal and the core network (CN). Significant functions of the MME are related to connection management and bearer management, which are handled via Non Access Stratum (NAS) protocols. The S-GW is an anchor point for mobile terminal mobility, and also includes other functionalities such as temporary down link (DL) data buffering while the mobile terminal is being paged, packet routing and forwarding to the right base station, and/or gathering of information for charging and lawful interception. The Packet Data Network (PDN) Gateway (P-GW) is the node responsible for mobile terminal Internet Protocol (IP) address allocation, as well as Quality of Service (QoS) enforcement, as further discussed below.

Figure 2:
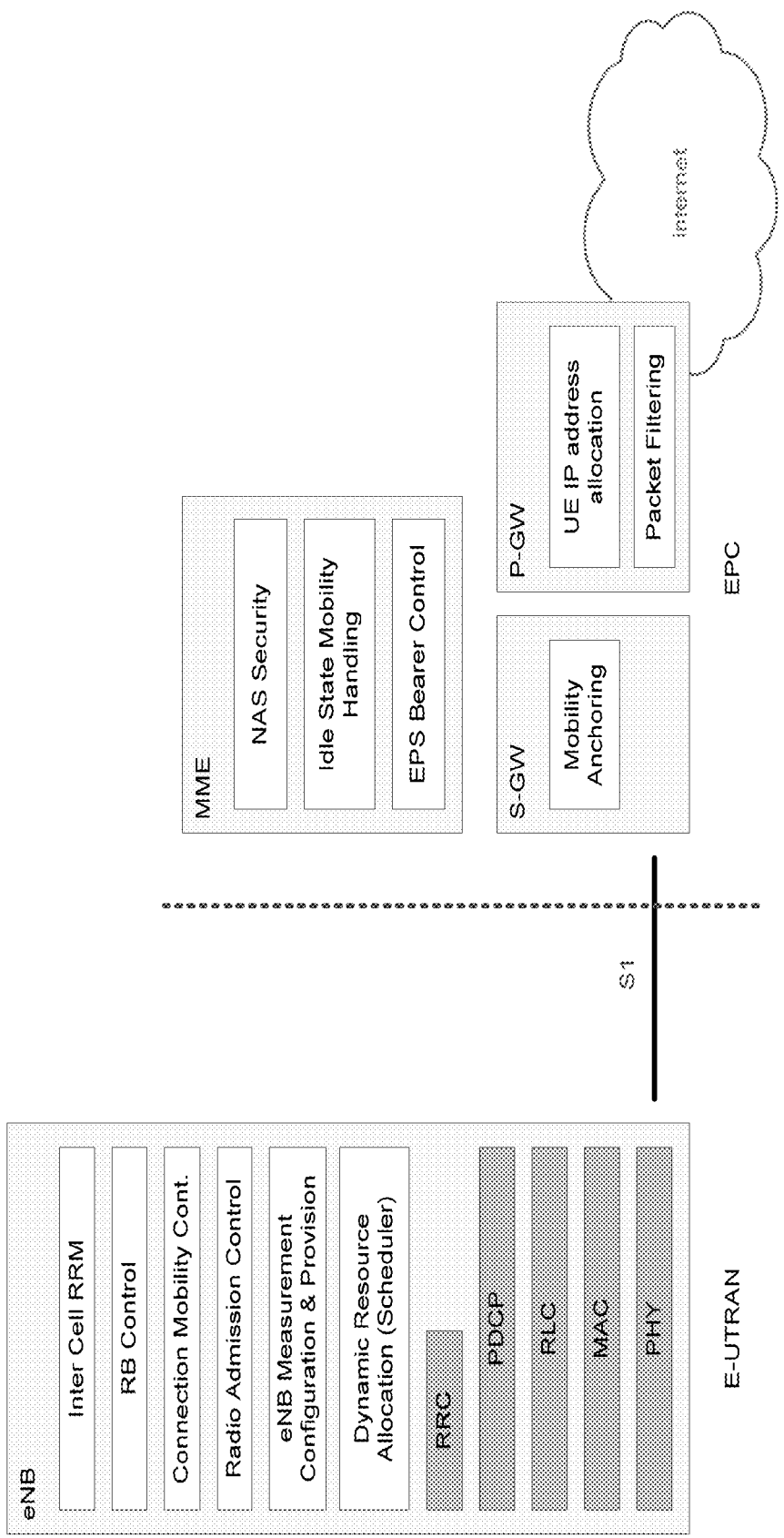
FIG. 2 is a block diagram illustrating a functional split between E-UTRAN and the Evolved Packet Core (EPC).

FIG. 2 illustrates a summary of functionalities of the different nodes, and the reader is referred to 3GPP TS 36.300 v. 11.6.0 and the references therein for further details of functionalities of the different nodes. In FIG. 2, blocks eNB, MME, S-GW, and P-GW illustrate logical nodes; blocks Inter Cell RRM, RB Control, Connection Mobility Control, Radio Admission Control, eNB Measurement Configuration & Provision, Dynamic Resource Allocation (Scheduler), NAS Security, Idle State Mobility Handling, Evolved Packet System (EPS) bearer Control, Mobility Anchoring, UE IP address allocation, and Packet Filtering illustrate functional entities of the control plane; and blocks Radio Resource Control (RRC), Packet Data Convergence Protocol (PDCP), Radio Link Control (RLC), Medium Access Control (MAC), and Physical (PHY) illustrate the radio protocol layers.

Heterogeneous Networks and Dual/Multiple Connectivity

Figure 3:
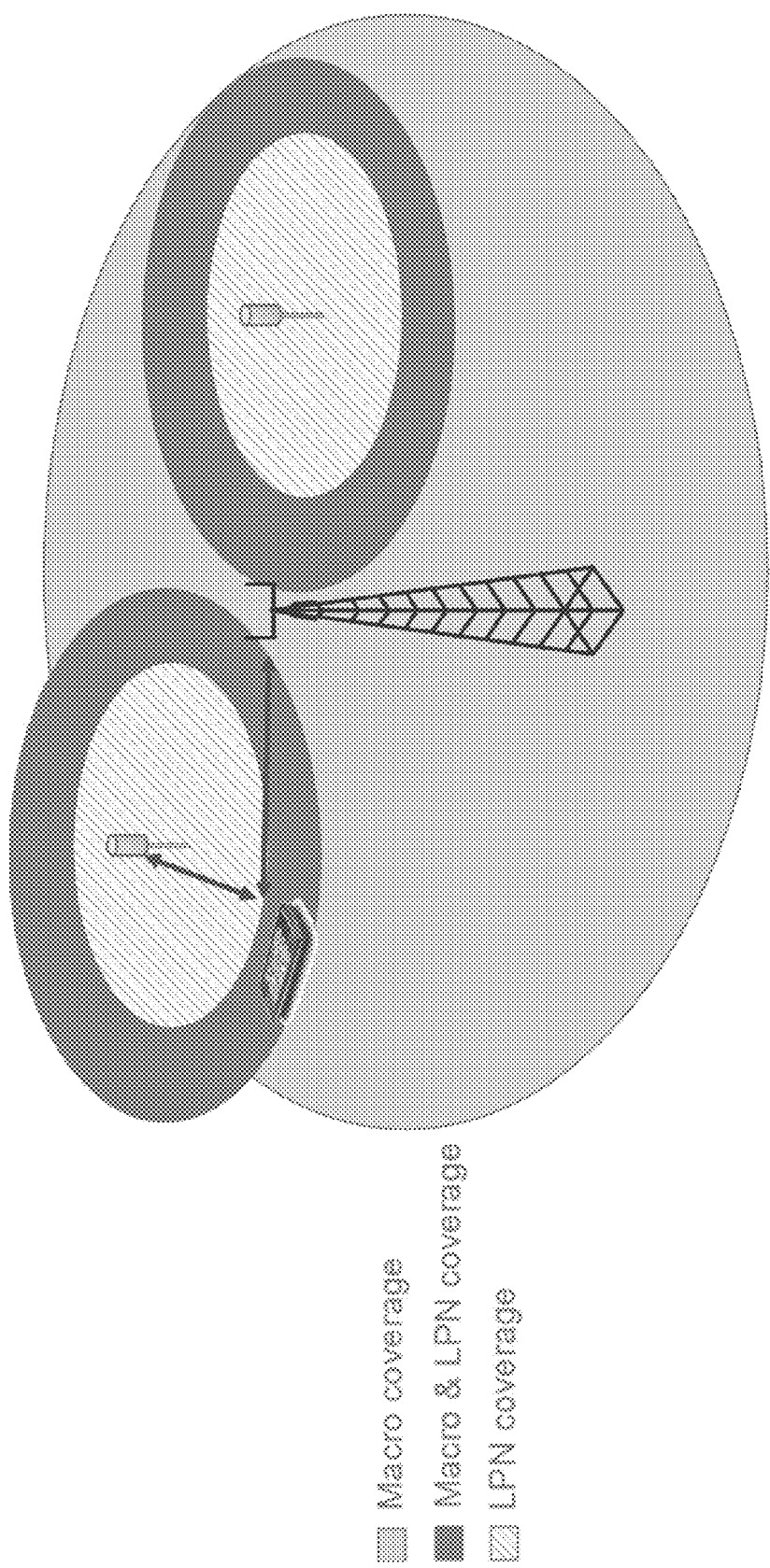
FIG. 3 is a schematic diagram illustrating a heterogeneous deployment with a higher-power macro node and a lower-power pico node according to some embodiments.

A heterogeneous deployment or heterogeneous network, as illustrated in FIG. 3, includes network transmission nodes, e.g., micro and pico nodes or base stations, operating with different transmit powers and with overlapping coverage areas. A heterogeneous deployment/network is considered as an interesting deployment strategy for cellular networks. In such a deployment, the low-power nodes, "pico nodes", are typically assumed to offer high data rates (Mbit/s) and/or to provide increased/high capacity, users/$m^2$ or Mbit/s/$m^2$, in local areas, striped areas in figure, where increased data rates/capacity is/are needed/desired, while the high-power nodes, e.g. "macro nodes", are assumed to provide full-area coverage, grey area in figure. In practice, the macro nodes may correspond to currently deployed macro cells while the pico nodes are later-deployed nodes, provided to extend capacity and/or achievable data rates within the macro-cell coverage area where needed/desired. FIG. 3 illustrates a heterogeneous deployment with a higher-power macro node and two lower-power pico nodes, or "low-power nodes" (LPNs). In a typical case, there may be multiple LPNs within the coverage area of a macro node. Areas with both macro and pico coverage are dark grey in the figure.

Protocol Architecture Dual Connectivity

The term "dual connectivity" is used to refer to operation where the mobile terminal consumes radio resources provided by at least two different network points connected with non-ideal backhaul. Furthermore, each base station involved in dual connectivity for a mobile terminal may assume different roles. Those roles do not necessarily depend on the base station's power class and may vary among mobile terminals. E.g. a Master eNB (MeNB) and a Secondary eNB (SeNB).

Figure 4:
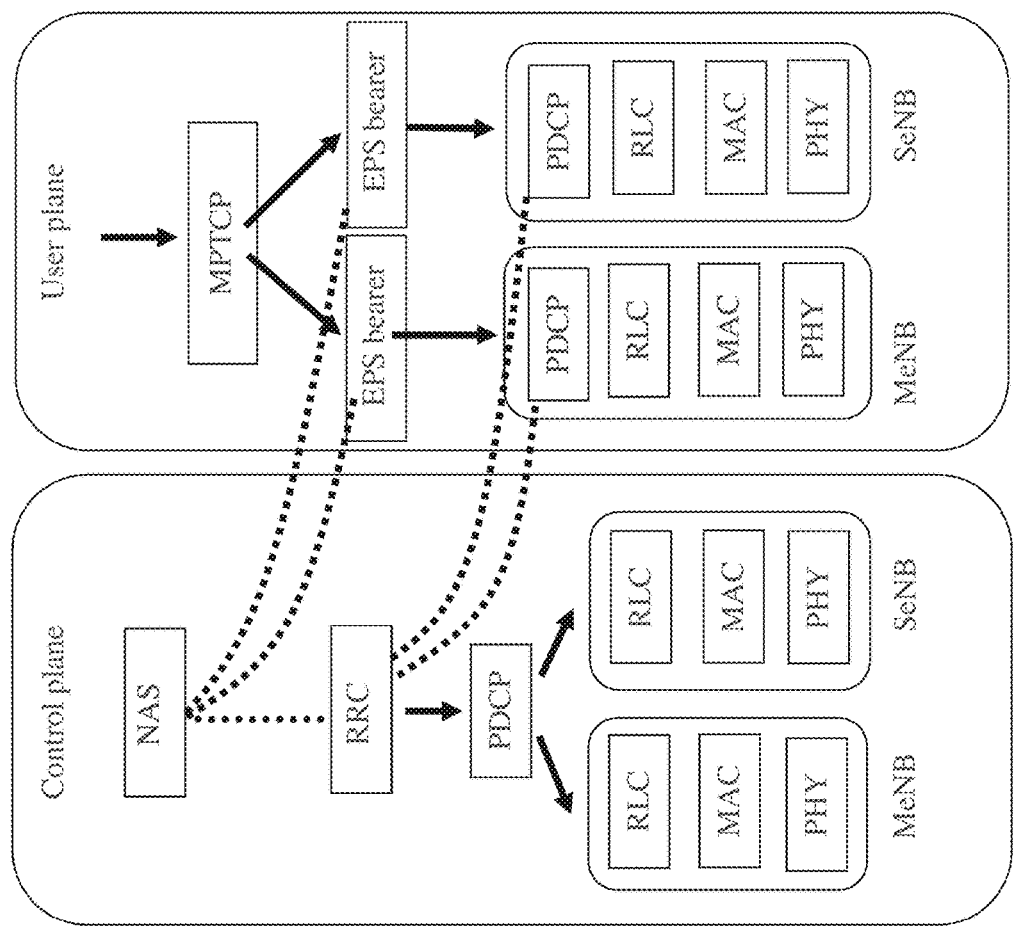
FIG. 4 illustrates an example protocol architecture for multiple connectivity.

To support multiple connectivity to low-power nodes (LPNs), several architectural options are possible both for the control and user planes. For the user plane, a centralized approach may be provided where the PDCP, or even the RLC, is terminated at an anchor node only and a booster node terminates at the RLC, or even the MAC, level. A decentralized approach may be to have the booster to terminate at the PDCP level. A similar approach can be taken in the control plane, i.e., distributed or centralized PDCP/RLC, but on top of that the additional dimension of centralizing or distributing the RRC may be provided. FIG. 4 shows example control and user plane architectures where the user plane uses distributed PDCP, while the control plane is centralized at the PDCP level at the anchor node. Note that in FIG. 4, user plane aggregation, i.e., the possibility to split the packets belonging to one application data flow over the anchor and booster links, can be realized by using a higher layer aggregation protocol like multi-path Transmission Control Protocol (MTCP) with separate EPS bearers.

One problem that arises in a dual connectivity scenario is that since a mobile terminal is simultaneously connected to two base stations, there are possibilities that a mobile terminal needs to share its limited uplink power while transmitting simultaneously towards two different base stations. Applying existing independent power control algorithms to each of two, or more, links may cause a situation where the mobile terminal cannot support both links with the requested power levels. This is because of the fact that two different and independent power control loops will provide two different, and uncoordinated, uplink power levels related to the links. Because of power limitations at the mobile terminal, the requested levels might not be possible for mobile terminal. In various embodiments of the presently disclosed techniques, as detailed below, scaling factors are used to scale down the required uplink power levels, so that the maximum allowed transmit power level is satisfied.

These techniques include methods of uplink power control in dual connectivity mode. The methods may be used to ensure that even if two power control loops corresponding to two links run independently, total power constraints for the mobile terminal are met. Several different methods of allocating power while ensuring that power constraints are satisfied are presented. Methods of coordination between the two links, to make sure that the power control loops for the two links does not violate the total power constraint, are also presented. While the techniques are described as applied to only two simultaneous/contemporaneous links, it will be readily appreciated that the solutions are equally applicable and readily extendible for mobile terminals connected to more than two nodes.

In LTE, the aim of uplink power control is to determine the average power over a single-carrier frequency-division multiple access (SC-FDMA). Uplink power control is applied for both common channel and dedicated channel transmissions, including those on the Physical Uplink Control Channel (PUCCH), the Physical Uplink Shared Channel (PUSCH), as well as for Sounding Reference Symbols (SRS).

LTE uses a combined open-loop and closed-loop power control algorithm. First, open loop power control is performed, where the mobile terminal calculates a basic open-loop set-point based on a link specific value, also referred to as a path-loss estimate or a path-loss value, and an base station-controlled semi-static base level, P0, which is a nominal power level common to all mobile terminals in the cell, but as adjusted by a mobile terminal-specific offset. Next, closed-loop power control is performed, where the base station updates a dynamic adjustment relative to the set-point. The mobile terminal adjusts the transmit power, using this dynamic closed-loop adjustment, based upon received Transmit Power Control (TPC) commands. It is also possible to connect the power control to a particular modulation and coding scheme used for the uplink transmission.

This approach is captured in the power-control formula shown below as Equation (1) for transmit power of the mobile terminal, $P_{UE}$.

$$P_{UE} = \min\left\{P_{CMAX}, \underbrace{P_0 + \alpha \cdot PL}_{\text{open-loop set-point}} + \underbrace{f(i)}_{\substack{\text{closed-loop}\\\text{adjustment}}} + \underbrace{\Delta_{TF}(i)}_{\text{MCS offset}} + \underbrace{10\log_{10}M}_{\text{bandwidth factor}}\right\} \quad (1)$$

In Equation (1), $P_{CMAX}$ is a configured maximum mobile terminal transmitted power, and M is the transmit bandwidth expressed in number of resource blocks. A scaling factor $\alpha \in \{0, 0.4, 0.5, 0.6, 0.7, 0.8, 0.9, 1\}$ is provided by higher layers, and PL is the downlink path-loss estimate calculated in the UE. $\Delta_{TF}$ is a dynamic offset, a Modulation and Coding scheme (MCS) offset, given by higher layers, while $f(i)$ is a function that represents the accumulation of TPC commands. Similar expressions for the case of PUSCH, PUCCH, SRS, and also for the case of simultaneous transmission of PUSCH and PUCCH can be found in TS 36.213 v. 11.3.0, "Evolved Universal Terrestrial Radio Access (E-UTRA); Physical layer procedures," available at www.3gpp.org.

Figure 5:
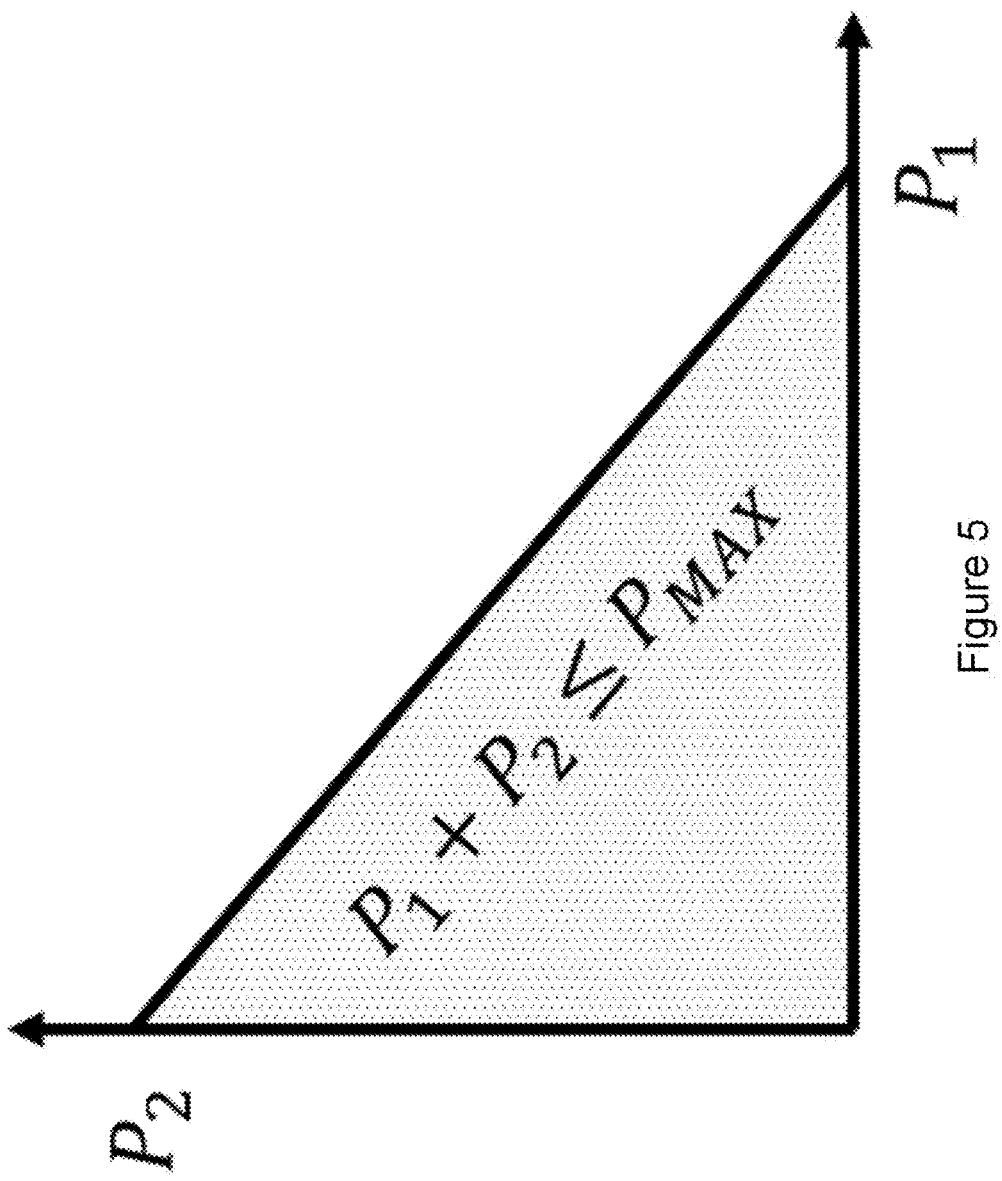
FIG. 5 illustrates a relationship between transmit powers for two mobile terminals, according to a total-power constraint.

As noted above, uplink power control becomes more complicated when a mobile terminal is supporting two, or more, contemporaneous links. For the case of two links, a first and a second link, denote the power assigned to the links as $P_1$ and $P_2$, where a total power constraint, i.e. $P_1 + P_2 \leq P_{MAX}$ must be met. $P_{MAX}$ is the maximum allowed transmission power that the mobile terminal may use in one carrier. As shown in FIG. 5, $P_1 + P_2$ for the two contemporaneous links needs to be chosen such that, the total power transmitted by the mobile terminal for one carrier is either on the diagonal line, or below the diagonal line. In two extreme cases, either $P_1$ or $P_2$ are equal to $P_{MAX}$, when either $P_2$ or $P_1$ are set to zero respectively. P2 is defined along a vertical axis and P1 is defined along a horizontal axis in the figure.

As part of developing embodiments herein a problem has first been identified. If legacy power control in dual connectivity mode is used, then P1 and P2 are set by the mobile terminal by following the uplink power control as described in Equation (1), for example. Since these two power levels are determined independently, based on path loss values related to two different links, there might be cases where the total power constraint $P_1 + P_2 \leq P_{MAX}$ is not satisfied. In other words, the mobile terminal may become power limited and thus unable to support both links with the required power levels while also satisfying the maximum allowed power level condition.

To address this problem, $P_1$ and $P_2$ must be updated, based on certain criterion, to ensure that certain fairness are achieved. According to some embodiments of the present techniques, if the power constraint $P_1 + P_2 \leq P_{MAX}$ is not satisfied, then the two power levels $P_1$ and $P_2$ corresponding to the two links are scaled. Two scaling parameters $\alpha$ and $\beta$ are defined, such that:

$$\alpha P_1 + \beta P_2 \leq P_{MAX} \quad (2)$$

Here, the effective output power directed at link 1 and link 2 will become $\alpha P_1$ and $\beta P_2$, respectively. In the following, a few methods according to embodiments herein for determining the scaling factors that are used for the transmit power for the two links are described.

Figure 6:
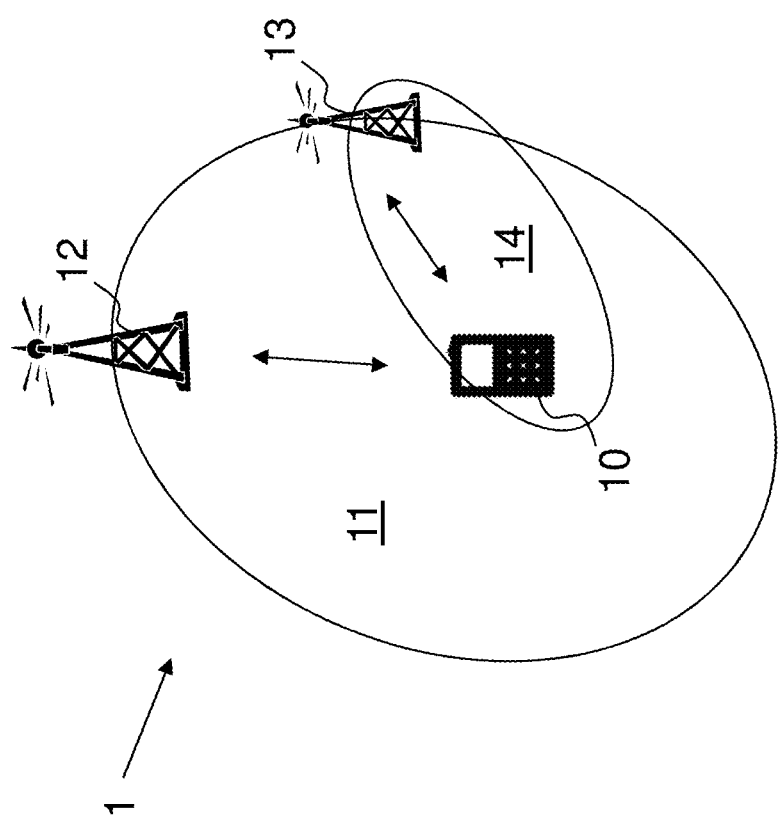
FIG. 6 is a schematic overview depicting a wireless communication network according to embodiments herein.

FIG. 6 is a schematic overview depicting a wireless communication network 1 according to embodiments herein. The wireless communication network 1 comprises one or more RANs and one or more CNs. In the wireless communication network 1, a mobile terminal 10, communicates via a Radio Access Network (RAN) to one or more core networks (CN). The wireless communication network 1 covers a geographical area which is divided into cell areas, e.g. a first cell 11 being served by a first base station being a first wireless network access point 12. The first wireless network access point 12 may serve one or more cells, such as the cell 11, and the first wireless network access point 12 may be a macro base station.

Furthermore, a second wireless network access point 13 provides radio coverage over a second cell 14. The second wireless network access point 13 may be a pico base station. However alternatively, the second wireless network access point 13 may be a macro base station and the first wireless network access point may be a pico base station. The wireless network access points may e.g. be base stations such as a NodeBs, an eNode Bs, base transceiver stations, Access Point Base Stations, base station routers, W-Fi access point, or any other network unit capable of communicating with a mobile terminal within the cell served by the wireless network access point depending e.g. on the radio access technology and terminology used.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cells uniquely in the whole wireless communication network 1 is also broadcasted in the cells.

Embodiments herein relate to controlling transmit power of the mobile terminal 10 in a dual connectivity mode. The mobile terminal 10 is configured to support two or more contemporaneous links, including a first link and a second link, with the two, or more, wireless network access points 12, 13. In embodiments herein the mobile terminal 10 independently calculates a respective unscaled uplink transmission power level for each link, based on a corresponding link-specific value. The mobile terminal 10 calculates a respective scaling factor for each link based on a total-power constraint and on one or more of the following calculations/equations described below. The mobile terminal 10 then applies the respective scaling factor to each respective unscaled uplink transmission power level, to obtain corresponding scaled power levels; and transmits over the two or more contemporaneous links at the respective scaled power levels.

Scaling Based on UL Resource Allocations

A first method of embodiments herein is based on assigning different effective output powers based on actual uplink resource allocations for the mobile terminal 10 from the two wireless network access points 12,13. An example for the LTE context is provided below. However, it will be appreciated that the same approach may be applied to other types of wireless communication networks.

First, denote the UL resource allocations also referred to as the number of physical resource blocks (PRBs) allocated for uplink transmission to the first link and the second link as $R_1$ and $R_2$, respectively. So, scaling factors $\alpha$ and $\beta$ may be defined as follows:

$$\alpha = \frac{R_1}{R_1 + R_2} \cdot \frac{P_{MAX}}{P_1} \qquad (3)$$

$$\beta = \frac{R_2}{R_1 + R_2} \cdot \frac{P_{MAX}}{P_2}$$

With this approach, scaling factors $\alpha$ and $\beta$ ensure that the transmitted power per PRB is equal for both links. These scaling factors may be updated and used on a from subframe-to-subframe basis, since $R_1$ and $R_2$ can vary between subframes for both the links. Illustrated embodiments herein relate to two contemporaneous links, however, the expressions may be generalized, as an example: for scaling based on UL resource allocations where $R_3$ defines the UL resource allocations for a third link and $P_3$ represents a transmit power for the third link $$\alpha = \frac{R_1}{R_1 + R_2 + R_3} \cdot \frac{P_{MAX}}{P_1}$$

$$\beta = \frac{R_2}{R_1 + R_2 + R_3} \cdot \frac{P_{MAX}}{P_2}$$

$$\gamma = \frac{R_3}{R_1 + R_2 + R_3} \cdot \frac{P_{MAX}}{3}$$

where in this case $\alpha P_1 + \beta P_2 + \gamma P_3 \leq P_{MAX}$.

Scaling Based on the Quality of the Link

In a second approach, different effective output powers are assigned to the first and second links based on the qualities of the links. One example link quality is the path-gain, i.e., the inverse of the path-loss. This approach may be applied such that the poorer link gets a higher share of power. An example of this approach is shown below.

If the path-gain seen at both links is defined as $PG_1$ and $PG_2$, then scaling factors $\alpha$ and $\beta$ can be defined as:

$$\alpha = \frac{PG_1}{PG_1 + PG_2} \cdot \frac{P_{MAX}}{P_1} \qquad (4)$$

$$\beta = \frac{PG_2}{PG_1 + PG_2} \cdot \frac{P_{MAX}}{P_2}$$

Note that in the expressions above, the path-gain values PGs are in linear scale and are not in dB. It will be appreciated that equivalent expressions may be formulated in terms of path loss or other parameter characterizing the effects of the propagation channel on the transmitted signal's power. The path-gain values PGs can include all gains experienced by the radio signal as it passes through the entire propagation chain, e.g., the actual propagation path-gain due to distance, antenna gain, insertion loss and other losses seen at Radio Frequency (RF) links. In some cases, some of these components of the path-gain values PGs may be the same or insubstantially different for the two links, in which case these components might be ignored in the path-gain calculation for purposes of computing the scaling factors. As described in the earlier embodiment related to UL resource allocations, the procedure to determine the scaling factors between two links can be generalized to more than two links in the same way as described above.

Scaling Based on UE Buffer Clearing

In another approach, the assignment of different effective output powers or transmit powers depends on the uplink buffer state for each of the uplink links. For example, if the mobile terminal 10 has more data to send to one of the wireless network access points than the other, a higher power can be assigned to that corresponding link. An example of this approach is detailed as follows.

If total uplink resource grants, which is an indication of the uplink buffer state, for the first link and the second link are defined as RG1 and RG2, respectively, then e.g. the first wireless network access point can signal a parameter $\lambda$ to the mobile terminal 10, where $\lambda$ is defined as:

$$\lambda = \frac{RG_1}{RG_1 + RG_2} \qquad (5)$$

Based on $\lambda$, scaling factors $\alpha$ and $\beta$ can be defined as:

$$\alpha = \lambda$$

$$\beta = 1 - \lambda \qquad (6)$$

The involved wireless network access points may communicate over a backhaul regarding the total resource grants for the mobile terminal 10, so that at least one of the wireless network access points defines the parameter $\lambda$ and signals it to the mobile terminal 10. Alternatively, the mobile terminal 10 may determine the parameter $\lambda$ based on UL resource grant information signaled to the mobile terminal 10 from both wireless network access points.

Scaling Based on Priority

In another approach, the assignment of different effective output powers depends on the relative priorities of the different links. For instance the first link with higher priority may be assigned all the power it needs, while the second link gets power only up to the remaining available power. As an example of this approach, assume that the first link has priority over the second link. Then, scaling factors α and β can be defined as:

$$\alpha = 1 \quad (7)$$
$$\beta = \frac{P_{MAX} - P_1}{P_2}$$

Alternatively, when the second link has priority over the first link, scaling factors α and β are defined as:

$$\alpha = \frac{P_{MAX} - P_2}{P_1} \quad (8)$$
$$\beta = 1$$

The scaling factors may also be calculated based on any combination of the above. One method may e.g. be to find the scaling factors based on different methods, for example $(\alpha_1, \beta_2)$ based on UL resource allocation and $(\alpha_2, \beta_2)$ based on link quality, and then take an average of those scaling factors as $\alpha=(\alpha_1+\alpha_2)/2$ and $\beta=(\beta_1+\beta_2)/2$ or to select according to a priority of the different principles or methods. An example of combining different methods of determination of scaling factors could be to prioritize, UL resource allocation based scaling parameter over UL buffer status based scaling factor and vice versa. The same can also be done between other methods or principles.

Coordination Between the Two Wireless Network Access Points for UL Power Control According to this method, one or more power control parameters for the mobile terminal 10, such as $P_{MAX}$ or $P_0$, are coordinated between the two wireless network access points in such a manner as to guarantee that the power constraint is satisfied. Coordination can be in the form of signaling power control parameters explicitly, such that one wireless network access point informs the other wireless network access point about what parameters should be used. In an alternative approach, a wireless network access point that serves a mobile terminal that is in dual connectivity mode follows a different power control strategy or different set of power control parameters. E.g. one power control strategy may do open loop power control and another may do closed loop power control, or one power control strategy may use a certain P0 and another may use another P0.

Figure 7:
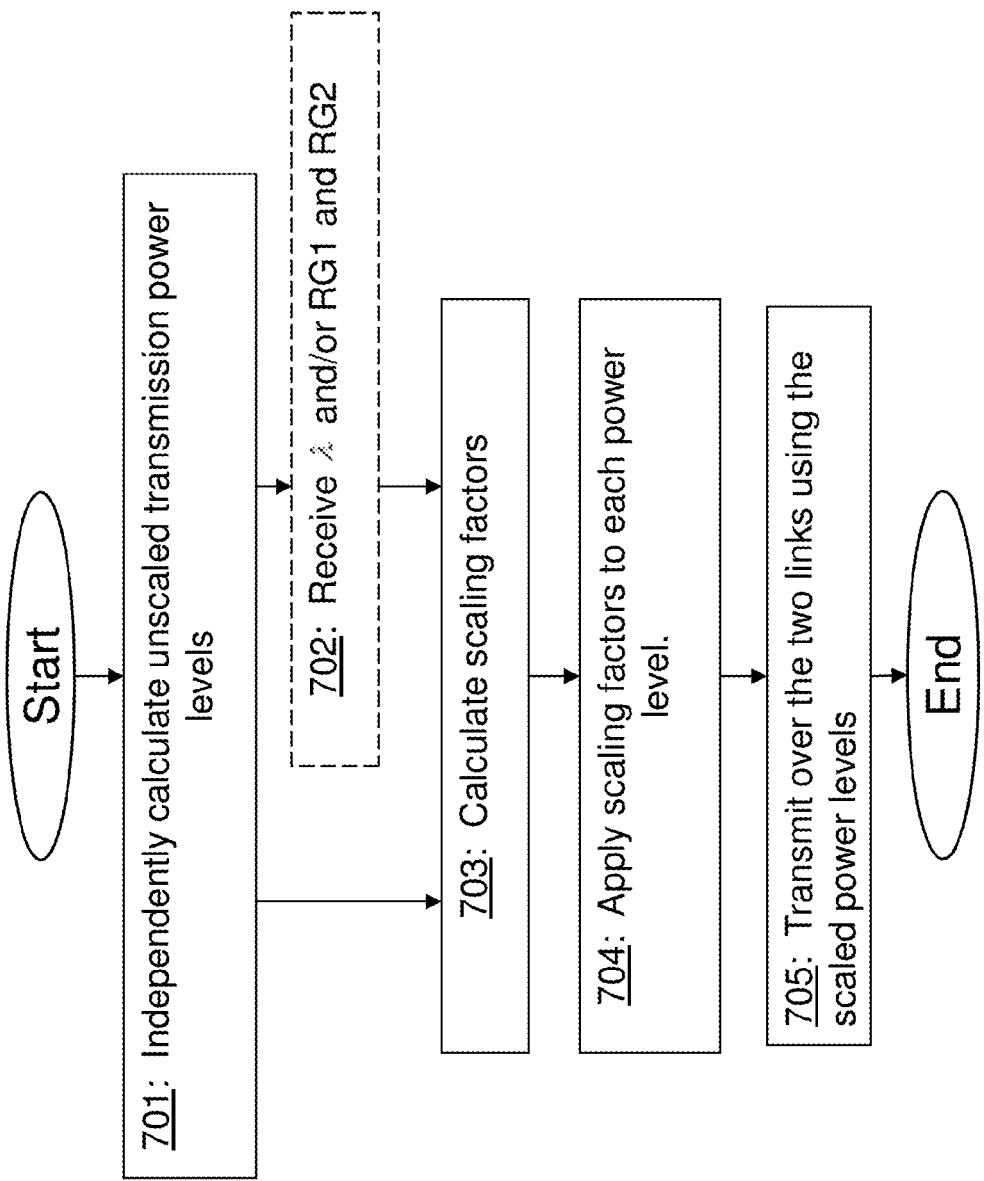
FIG. 7 is a process flow diagram illustrating actions of an example technique from a mobile terminal perspective.

FIG. 7 is a process flow diagram illustrating a generalized method for controlling transmit power, of the mobile terminal 10 in a dual connectivity mode. The mobile terminal 10 is configured to support two or more contemporaneous links, including a first link and a second link, with two or more wireless network access points 12, 13. It will be appreciated that many of the detailed techniques described above are examples of the method illustrated generally in FIG. 7. The actions do not have to be taken in the order stated below, but may be taken in any suitable order. Actions performed in some embodiments are marked with dashed boxes.

Action 701.

The mobile terminal 10 independently calculates a respective unscaled uplink transmission power level for each link, based on a corresponding link-specific value such as a path-loss value, allocated bandwidth value or similar.

Action 702.

The mobile terminal 10 may in some embodiments receive, from at least one of the wireless network access points, a parameter λ. The parameter λ determines a relation between uplink resource grants for the mobile terminal 10 from the first and second wireless network access points or for the first and second links. The mobile terminal 10 may also receive, from at least one of the wireless network access points, the total uplink resource grants $RG_1$ and $RG_2$ for the first and second links, respectively.

Action 703.

The mobile terminal 10 calculates a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link. In some embodiments, the two or more contemporaneous links are two contemporaneous links and the respective unscaled uplink transmission power level for each link comprises unscaled power levels $P_1$ and $P_2$ for the two contemporaneous links and the respective scaling factor for each link are corresponding scaling factors α and β related to the unscaled power levels $P_1$ and $P_2$ according to the expression $\alpha P_1 + \beta P_2 \leq P_{MAX}$, where $P_{MAX}$ is the total-power constraint. The unscaled power levels $P_1$ and $P_2$ for the two contemporaneous links may be related to the corresponding scaling factors α and β according to the expression $\alpha P_1 + \beta P_2 = P_{MAX}$.

In some embodiments the calculation of the respective scaling factor for each link is based on uplink resource allocation to each link such that:

$$\alpha = \frac{R_1}{R_1 + R_2} \cdot \frac{P_{MAX}}{P_1}; \text{ and}$$
$$\beta = \frac{R_2}{R_1 + R_2} \cdot \frac{P_{MAX}}{P_2};$$

wherein $R_1$ and $R_2$ represent numbers of resource blocks allocated for uplink transmissions to the first and second links, respectively.

In some embodiments the calculation of the respective scaling factor for each link is based on link quality for each link such that:

$$\alpha = \frac{PG_1}{PG_1 + PG_2} \cdot \frac{P_{MAX}}{P_1}; \text{ and } \beta = \frac{PG_2}{PG_1 + PG_2} \cdot \frac{P_{MAX}}{P_2};$$

wherein $PG_1$ and $PG_2$ represent path gains for the first and second links, respectively.

In some embodiments the calculation of the respective scaling factor for each link is based on uplink buffer state for each link such that:

$$\alpha = \frac{RG_1}{RG_1 + RG_2}; \text{ and } \beta = 1 - \alpha;$$

wherein $RG_1$ and $RG_2$ represent total uplink resource grants for the first and second links, respectively. The mobile terminal 10 may in some embodiments when having received the parameter λ from at least one of the wireless network access points, calculate the scaling factors α and β according to:

α=λ; and

β=1-λ.

In some embodiments the calculation of the respective scaling factor for each link is based on priority for each link such that:

α=1, for the link having the higher priority; and $$\beta = \frac{P_{MAX} - P_1}{P_2},$$

for the other link.

Action 704.

The mobile terminal 10 applies the respective scaling factor to each respective unscaled uplink transmission power level, to obtain corresponding scaled power levels.

Action 705.

The mobile terminal 10 transmits over the two or more contemporaneous links at the respective scaled power levels.

Figure 8:
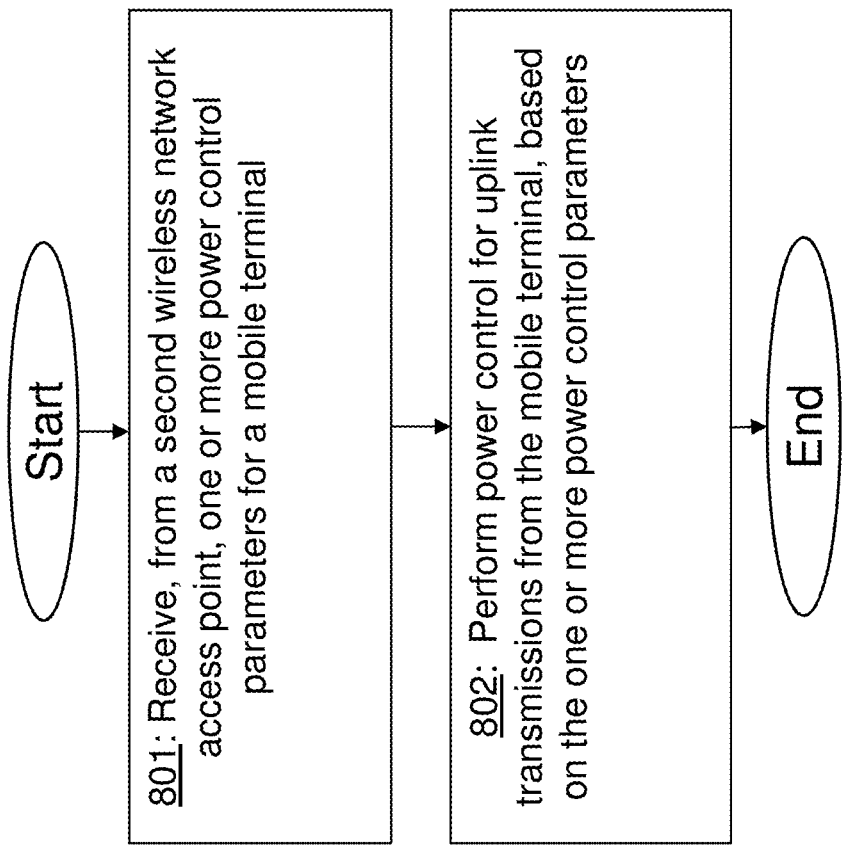
FIG. 8 is a process flow diagram illustrating actions of an example technique from a wireless network access point perspective.

The method actions in the first wireless network access point 12 of the two or more wireless network access points communicating with the mobile terminal 10 in dual connectivity mode, wherein the mobile terminal 10 is configured to support two or more contemporaneous links with the two or more corresponding wireless network access points, for controlling transmit power of the mobile terminal 10 according to some embodiments will now be described with reference to a flowchart depicted in FIG. 8. The actions do not have to be taken in the order stated below, but may be taken in any suitable order.

Action 801.

The first wireless network access point 12 receives from the second one of the two or more wireless network access points, one or more power control parameters for the mobile terminal 10.

Action 802.

The first wireless network access point 12 performs power control for uplink transmissions from the mobile terminal 10 in dual connectivity mode, based on the received one or more power control parameters. This may be performed by transmitting, to the mobile terminal 10 a parameter λ, and/or total uplink resource grants $RG_1$ and $RG_2$ for the first and second links to be used by the mobile terminal 10 when calculating a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link.

The one or more power control parameters may comprise a total-power constraint $P_{MAX}$ for the mobile terminal. In some embodiments the one or more power control parameters comprises an open-loop base level $P_{O1}$ for the mobile terminal for uplink transmissions to the first wireless network access point of the two or more wireless network access points, or an open-loop base level $P_{O2}$ for the mobile terminal for uplink transmissions to the second one of the two or more wireless network access points, or both.

Figure 9:
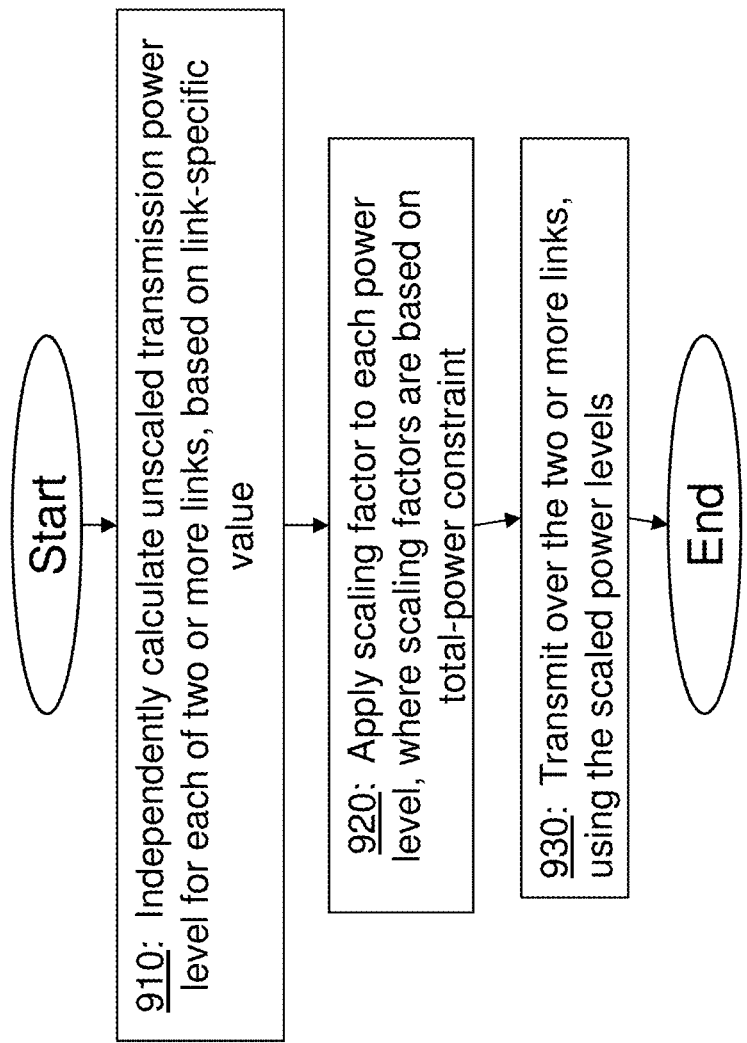
FIG. 9 is a process flow diagram illustrating actions of an example technique from a mobile terminal perspective.

FIG. 9 is a flowchart depicting embodiments herein. As shown at block 910, the illustrated method begins with independently calculating an unscaled uplink transmission power level for each link, based on a corresponding link-specific value. Next, a scaling factor is applied to each of the unscaled uplink transmission power levels, to obtain corresponding scaled power levels, where the scaling factors are calculated based on a total-power constraint. This is shown at block 920. Finally, as shown at block 930, signals are transmitted over the two or more contemporaneous links, at the respective scaled power levels.

In some embodiments, the mobile terminal 10 is configured to support two contemporaneous links with two corresponding wireless network access points, and the unscaled power levels $P_1$ and $P_2$ for the two contemporaneous links are related to the corresponding scaling factors α and β according to the expression $\alpha P_1 + \beta P_2 \leq P_{MAX}$, where $P_{MAX}$ is the total-power constraint. In some embodiments, the unscaled power levels $P_1$ and $P_2$ for the two contemporaneous links are related to the corresponding scaling factors α and β according to the expression $\alpha P_1 + \beta P_2 = P_{MAX}$.

In some embodiments, the scaling factors are calculated based on uplink resource allocations to the respective links, such that the scaling factor for a first link allocated more resources than a second link is larger than the scaling factor for the second link. Where the mobile terminal 10 is configured to support two contemporaneous links with two corresponding wireless network access points and the unscaled power levels $P_1$ and $P_2$ for the two contemporaneous links are related to the corresponding scaling factors α and β according to the expression $\alpha P_1 + \beta P_2 = P_{MAX}$, where $P_{MAX}$ is the total-power constraint, the calculations may be performed according to:

$$\alpha = \frac{R_1}{R_1 + R_2} \cdot \frac{P_{MAX}}{P_1}, \text{ and } \beta = \frac{R_2}{R_1 + R_2} \cdot \frac{P_{MAX}}{P_2},$$

in some embodiments, where $R_1$ and $R_2$ represent numbers of resource blocks allocated for uplink transmissions to the first and second links, respectively.

In some embodiments, the scaling factors are calculated based on link qualities for the respective links, such that the scaling factor for a first link having a better link quality than a second link is larger than the scaling factor for the second link. Where the mobile terminal 10 is configured to support two contemporaneous links with two corresponding wireless network access points and the unscaled power levels $P_1$ and $P_2$ for the two contemporaneous links are related to the corresponding scaling factors α and β according to the expression $\alpha P_1 + \alpha P_2 = P_{MAX}$, where $P_{MAX}$ is the total-power constraint, the calculations may be performed according to:

$$\alpha = \frac{PG_1}{PG_1 + PG_2} \cdot \frac{P_{MAX}}{P_1}; \text{ and } \beta = \frac{PG_2}{PG_1 + PG_2} \cdot \frac{P_{MAX}}{P_2};$$

in some embodiments, wherein $PG_1$ and $PG_2$ represent path-gains for the first and second links, respectively.

In some embodiments, the scaling factors are calculated based on uplink buffer states for the respective links, such that the scaling factor for a first link having more uplink data to be sent than a second link is larger than the scaling factor for the second link. Where the mobile terminal 10 is configured to support two contemporaneous links with two corresponding wireless network access points and the unscaled power levels $P_1$ and $P_2$ for the two contemporaneous links are related to the corresponding scaling factors α and β according to the expression $\alpha P_1 + \alpha P_2 = P_{MAX}$, where $P_{MAX}$ is the total-power constraint, the calculations may be performed according to:

$$\alpha = \frac{RG_1}{RG_1 + RG_2}; \text{ and } \beta = 1 - \alpha;$$

in some embodiments, where $RG_1$ and $RG_2$ represent total uplink resource grants for the first and second links, respectively. Some of these embodiments may further comprise receiving, from at least one of the wireless network access points, a parameter λ, and calculating the scaling factors α and β according to:

α=λ; and

β=1−λ.

Some of these embodiments may still further comprise receiving, from at least one of the wireless network access points, the total uplink resource grants $RG_1$ and $RG_2$.

In some embodiments, the scaling factors are calculated based on priorities for the respective links, such that the scaling factor for a first link having a higher priority than a second link is larger than the scaling factor for the second link. For example, where the mobile terminal 10 is configured to support two contemporaneous links with two corresponding wireless network access points and the unscaled power levels $P_1$ and $P_2$ for the two contemporaneous links are related to the corresponding scaling factors α and β according to the expression $\alpha P_1 + \beta P_2 = P_{MAX}$, where $P_{MAX}$ is the total-power constraint, the calculations may be performed according to:

α=1, for the link having the higher priority; and $$\beta = \frac{P_{MAX} - P_1}{P_2},$$

for the other link.

Hardware Implementations

Figure 10:
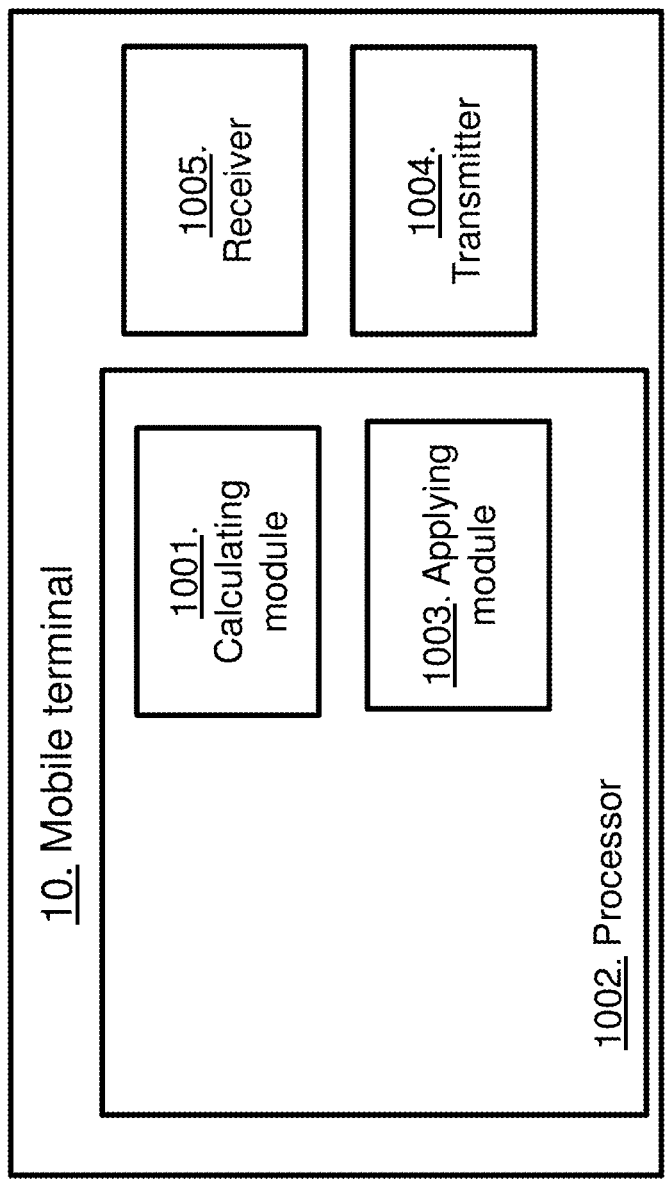
FIG. 10 is a block diagram illustrating elements of an example mobile terminal, according to some embodiments.

FIG. 10 is a block diagram depicting the mobile terminal 10 for controlling transmit power of the mobile terminal 10 in a dual connectivity mode wherein the mobile terminal 10 is configured to support two or more contemporaneous links, including a first link and a second link, with two or more wireless network access points.

The wireless terminal 10 may comprises a calculating module 1001 and/or a processor 1002. The mobile terminal 10, the calculating module 1001 and/or the processor 1002 may be configured to independently calculate a respective unscaled uplink transmission power level for each link, based on a corresponding link-specific value. The mobile terminal 10, the calculating module 1001 and/or the processor 1002 may also be configured to calculate a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link.

The wireless terminal 10 may further comprises an applying module 1003. The mobile terminal 10, the applying module 1003 and/or the processor 1002 may be configured to apply the respective scaling factor to each respective unscaled uplink transmission power level, to obtain corresponding scaled power levels.

The mobile terminal 10 also comprises a transmitter 1004. The mobile terminal 10, the transmitter 1004 and/or the processor 1002 may be configured to transmit over the two or more contemporaneous links at the respective scaled power levels.

The two or more contemporaneous links may in some embodiments be two contemporaneous links, i.e. the first and second link, and the respective unscaled uplink transmission power level for each link may comprise unscaled power levels $P_1$ and $P_2$ for the two contemporaneous links and the respective scaling factor for each link may be corresponding scaling factors α and β related to the unscaled power levels $P_1$ and $P_2$ according to the expression $\alpha P_1 + \beta P_2 \leq P_{MAX}$, where $P_{MAX}$ is the total-power constraint. The unscaled power levels $P_1$ and $P_2$ for the two contemporaneous links may be related to the corresponding scaling factors α and β according to the expression $\alpha P_1 + \beta P_2 = P_{MAX}$. The two or more contemporaneous links may be two contemporaneous links and the respective unscaled uplink transmission power level for each link may comprise unscaled power levels $P_1$ and $P_2$ for the two contemporaneous links and the respective scaling factor for each link may be corresponding scaling factors α and β related to the unscaled power levels $P_1$ and $P_2$ according to the expression $\alpha P_1 + \beta P_2 = P_{MAX}$, where $P_{MAX}$ is the total-power constraint. Then the mobile terminal 10, the calculating module 1001 and/or the processor 1002 may be configured to calculate the respective scaling factor for each link based on uplink resource allocation to each link such that:

$$\alpha = \frac{R_1}{R_1 + R_2} \cdot \frac{P_{MAX}}{P_1}; \text{ and } \beta = \frac{R_2}{R_1 + R_2} \cdot \frac{P_{MAX}}{P_2};$$

wherein $R_1$ and $R_2$ represent numbers of resource blocks allocated for uplink transmissions to the first and second links, respectively.

The two or more contemporaneous links may be two contemporaneous links and the respective unscaled uplink transmission power level for each link may comprise unscaled power levels $P_1$ and $P_2$ for the two contemporaneous links and the respective scaling factor for each link may be corresponding scaling factors α and β related to the unscaled power levels $P_1$ and $P_2$ according to the expression $\alpha P_1 + \alpha P_2 = P_{MAX}$, where $P_{MAX}$ is the total-power constraint. Then the mobile terminal 10, the calculating module 1001 and/or the processor 1002 may be configured to calculate the respective scaling factor for each link based on link quality for each link such that:

$$\alpha = \frac{PG_1}{PG_1 + PG_2} \cdot \frac{P_{MAX}}{P_1}; \text{ and } \beta = \frac{PG_2}{PG_1 + PG_2} \cdot \frac{P_{MAX}}{P_2};$$

wherein $PG_1$ and $PG_2$ represent path gains for the first and second links, respectively.

In some embodiments the two or more contemporaneous links may be two contemporaneous links and the respective unscaled uplink transmission power level for each link may comprise unscaled power levels $P_1$ and $P_2$ for the two contemporaneous links and the respective scaling factor for each link may be corresponding scaling factors α and β related to the unscaled power levels $P_1$ and $P_2$ according to the expression $\alpha P_1 + \beta P_2 = P_{MAX}$, where $P_{MAX}$ is the total-power constraint. Then the mobile terminal 10, the calculating module 1001 and/or the processor 1002 may be configured to calculate the respective scaling factor for each link based on uplink buffer state for each link such that:

$$\alpha = \frac{RG_1}{RG_1 + RG_2}; \text{ and } \beta = 1 - \alpha;$$

wherein $RG_1$ and $RG_2$ represent total uplink resource grants for the first and second links, respectively.

The mobile terminal 10 further comprises a receiver 1005. The mobile terminal 10, the receiver 1005 and/or the processor 1002 may in some embodiments be configured to receive, from at least one of the wireless network access points, a parameter λ, and then the mobile terminal 10, the calculating module 1001 and/or the processor 1002 may be configured to calculate the scaling factors α and β according to:

α=λ; and

β=1−λ.

The mobile terminal 10, the receiver 1005 and/or the processor 1002 may be configured to receive, from at least one of the wireless network access points, the total uplink resource grants $RG_1$ and $RG_2$ for the first and second links, respectively.

In some embodiments the two or more contemporaneous links may be two contemporaneous links and the respective unscaled uplink transmission power level for each link may comprise unscaled power levels $P_1$ and $P_2$ for the two contemporaneous links and the respective scaling factor for each link may be corresponding scaling factors α and β related to the unscaled power levels $P_1$ and $P_2$ according to the expression $\alpha P_1 + \beta P_2 = P_{MAX}$, where $P_{MAX}$ is the total-power constraint. Then the mobile terminal 10, the calculating module 1001 and/or the processor 1002 may be configured to calculate the respective scaling factor for each link based on priority for each link such that:

α=1, for the link having the higher priority, e.g. the first link; and $$\beta = \frac{P_{MAX} - P_1}{P_2},$$

for the other link, e.g. the second link.

Figure 11:
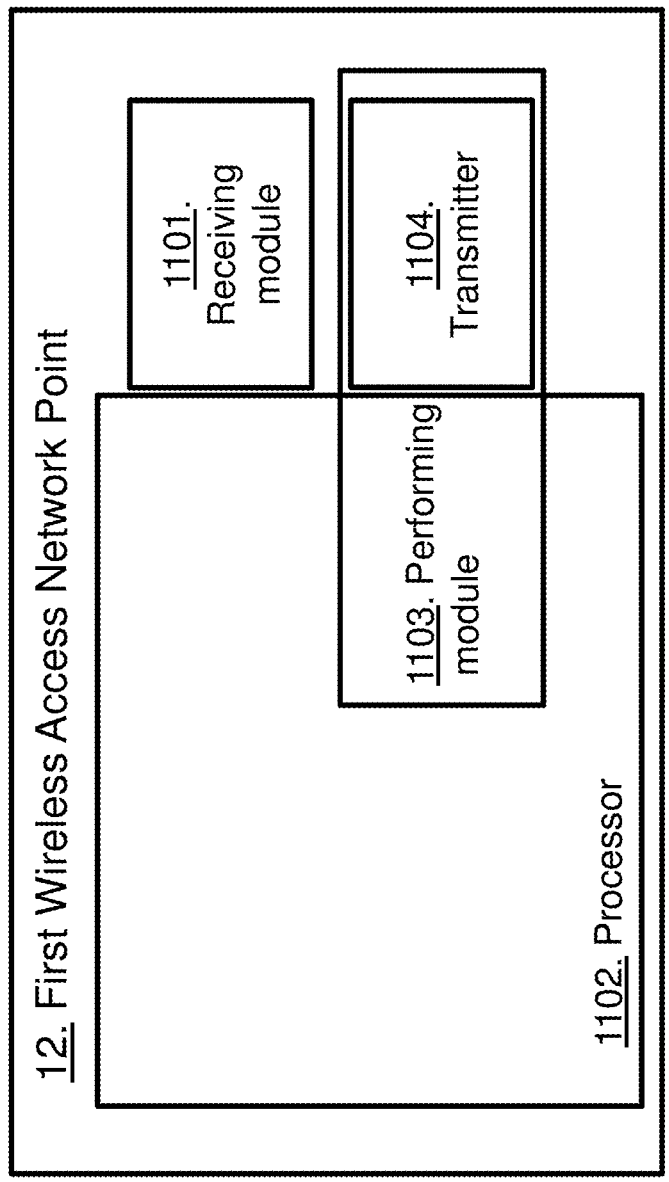
FIG. 11 is a block diagram illustrating elements of an example wireless network access point, according to some embodiments.

FIG. 11 is a block diagram depicting a first wireless network access point 12 of two or more wireless network access points configured to communicate with the mobile terminal 10 in dual connectivity mode for controlling transmit power of the mobile terminal 10. In order to communicate in dual connectivity mode the mobile terminal 10 is configured to support two or more contemporaneous links, including a first and a second link, with the two or more corresponding wireless network access points.

The first wireless network access point 12 may comprise a receiving module 1101 and/or a processor 1102. The first wireless network access point 12, the receiving module 1101 and/or the processor 1102 may be configured to receive from the second wireless network access point 13 one or more power control parameters for the mobile terminal 10. The one or more power control parameters may comprise a total-power constraint $P_{MAX}$ for the mobile terminal 10. The one or more power control parameters may comprise an open-loop base level $P_{01}$ for the mobile terminal 10 for uplink transmissions to the first wireless network access point of the two or more wireless network access points, or an open-loop base level $P_{02}$ for the mobile terminal 10 for uplink transmissions to the second one of the two or more wireless network access points, or both.

The first wireless network access point 12 may further comprise a performing module 1103.

The first wireless network access point 12, the performing module 1103 and/or the processor 1102 may be configured to perform uplink power control for uplink transmissions from the mobile terminal 10 in dual connectivity mode, based on the received one or more power control parameters.

Figure 12:
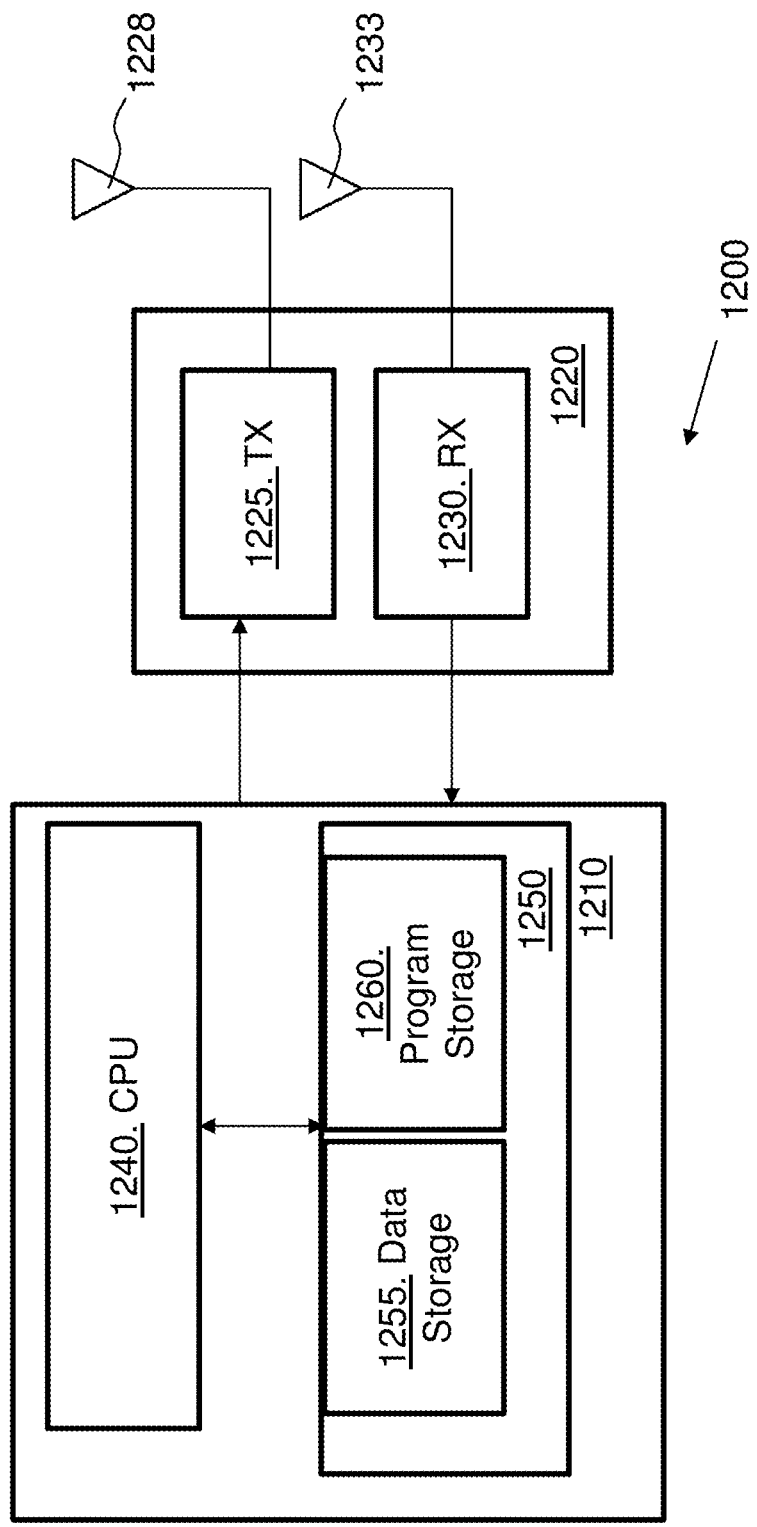
FIG. 12 is a block diagram illustrating elements of an example mobile terminal, according to some embodiments.

The first wireless network access point 12 may comprise a transmitter 1104. The first wireless network access point 12, the transmitter 1104 and/or the processor 1002 may be configured, to perform the uplink power control, by transmitting to the mobile terminal 10 a parameter λ, and/or total uplink resource grants $RG_1$ and $RG_2$ for the first and second links to be used by the mobile terminal 10 when calculating a respective scaling factor for each link based on a total-power constraint and on one or more of the following: uplink resource allocation to each link, such that the scaling factor for the first link allocated more resources than the second link is larger than the scaling factor for the second link, link quality for each link, such that the scaling factor for the first link having a better link quality than the second link is larger than the scaling factor for the second link, uplink buffer state for each link, such that the scaling factor for the first link having more uplink data to be sent than the second link is larger than the scaling factor for the second link, and priority for each link, such that the scaling factor for the first link having a higher priority than the second link is larger than the scaling factor for the second link. Several of the techniques and methods described above may be implemented using radio circuitry and electronic data processing circuitry provided in a mobile terminal. FIG. 12 illustrates features of an example mobile terminal 10 denoted as 1200 according to several embodiments of the present invention. Mobile terminal 1200, which may be a UE configured for dual-connectivity operation with an LTE network (E-UTRAN), for example, comprises a transceiver unit 1220 for communicating with one or more base stations as well as a processing circuit 1210 for processing the signals transmitted and received by the transceiver unit 1220. Transceiver unit 1220 includes a transmitter 1225 coupled to one or more transmit antennas 1228 and receiver 1230 coupled to one or more receiver antennas 1233. The same antenna(s) 1228 and 1233 may be used for both transmission and reception. Receiver 1230 and transmitter 1225 use known radio processing and signal processing components and techniques, typically according to a particular telecommunications standard such as the 3GPP standards for LTE. Note also that transceiver unit 1220 may comprise separate radio and/or baseband circuitry for each of two or more different types of radio access network, such as radio/baseband circuitry adapted for E-UTRAN access and separate radio/baseband circuitry adapted for W-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1210 comprises one or more processors 1240 coupled to one or more memory devices 1250 that make up a data storage memory 1255 and a program storage memory 1260. Processor 1240, identified as CPU 1240 in FIG. 12, may be a microprocessor, microcontroller, or digital signal processor, in some embodiments. More generally, processing circuit 1210 may comprise a processor/firmware combination, or specialized digital hardware, or a combination thereof. Memory 1250 may comprise one or several types of memory such as read-only memory (ROM), random-access memory, cache memory, flash memory devices, optical storage devices, etc. Because mobile terminal 1200 supports multiple radio access networks, processing circuit 1210 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1210 include modulation and coding of transmitted signals and the demodulation and decoding of received signals. In several embodiments of the present invention, processing circuit 1210 is adapted, using suitable program code stored in program storage memory 1260, for example, to carry out one of the techniques described above for controlling transmit power of the mobile terminal 1200. Of course, it will be appreciated that not all of the steps of these techniques are necessarily performed in a single microprocessor or even in a single module.

Figure 13:
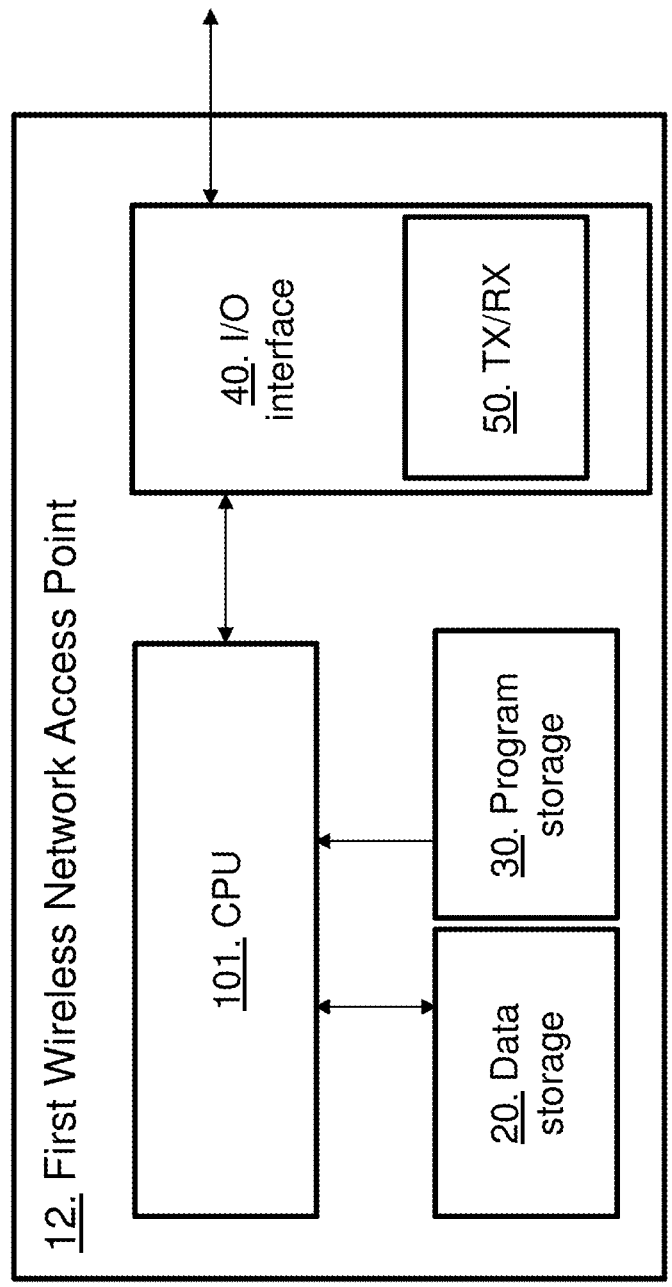
FIG. 13 is a block diagram illustrating elements of an example wireless network access point, according to some embodiments.

Similarly, several of the techniques and processes described above can be implemented in a network node, such as an eNodeB or other node in a 3GPP network. FIG. 13 is a schematic illustration of the wireless network access point 12 in which a method embodying any of the presently described network-based techniques can be implemented. A computer program for controlling the wireless network access point 12 to carry out a method according to embodiments herein is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 101, retrieving data as required from the data storage 20. Output information resulting from performance of a method according to embodiments herein can be stored back in the data storage 20, or sent to an Input/Output (I/O) interface 40, which includes a network interface for sending and receiving data to and from other wireless network access points and which may also include a radio transceiver TX/RX 50 for communicating with one or more terminals.

Accordingly, in various embodiments of the invention, processing circuits, such as the CPU 101 and memory circuits 20 and 30 in FIG. 13, are configured to carry out one or more of the techniques described in detail above. Likewise, other embodiments may include base stations and/or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows. Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the scope of present inventive concepts. Thus, to the maximum extent allowed by law, the scope of present inventive concepts are to be determined by the broadest permissible interpretation of the present disclosure, and shall not be restricted or limited by the foregoing detailed description. It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

What is claimed is:

1. A method for controlling transmit power of a mobile terminal, the method being performed by the mobile terminal in a dual connectivity mode wherein the mobile terminal is configured to support two or more contemporaneous links, including a first link and a second link, with two or more wireless network access points, the method comprising:
   independently calculating respective unscaled uplink transmission power levels for the contemporaneous links, based on corresponding link-specific values;
   calculating respective scaling factors for the contemporaneous links to satisfy a total-power constraint and to allocate respective power levels to the links in proportion with values that the links have for one or more criterions;
   applying the respective scaling factors to the respective unscaled uplink transmission power levels, to obtain corresponding scaled power levels; and
   transmitting over the two or more contemporaneous links at the respective scaled power levels.

2. The method of claim 1, wherein the one or more criterions comprise uplink resource allocation.

3. The method of claim 1, wherein the one or more criterions comprise link quality.

4. The method of claim 1, wherein the one or more criterions comprise uplink buffer state.

5. The method of claim 1, wherein the one or more criterions comprise priority.

6. The method of claim 1, wherein:
the two or more contemporaneous links are two contemporaneous links;
the respective unscaled uplink transmission power levels for the links comprises unscaled power levels $P_1$ and $P_2$ for the two contemporaneous links; and
the respective scaling factors for the links are corresponding scaling factors $\alpha$ and $\beta$ related to the unscaled power levels $P_1$ and $P_2$ according to the expression $\alpha P_1 + \beta P_2 \leq P_{MAX}$, where $P_{MAX}$ is the total-power constraint.

7. The method of claim 6, wherein the unscaled power levels $P_1$ and $P_2$ for the two contemporaneous links are related to the corresponding scaling factors $\alpha$ and $\beta$ according to the expression $\alpha P_1 + \beta P_2 = P_{MAX}$.

8. The method of claim 7, wherein:
the calculation of the respective scaling factors for the links is based on uplink resource allocation to each link such that:

$$\alpha = \frac{R_1}{R_1 + R_2} \cdot \frac{P_{MAX}}{P_1}; \text{ and } \beta = \frac{R_2}{R_1 + R_2} \cdot \frac{P_{MAX}}{P_2};$$

and
$R_1$ and $R_2$ represent numbers of resource blocks allocated for uplink transmissions to the first and second links, respectively.

9. The method of claim 7, wherein:
the calculation of the respective scaling factors for the links is based on link quality for each link such that:

$$\alpha = \frac{PG_1}{PG_1 + PG_2} \cdot \frac{P_{MAX}}{P_1}; \text{ and } \beta = \frac{PG_2}{PG_1 + PG_2} \cdot \frac{P_{MAX}}{P_2};$$

and
$PG_1$ and $PG_2$ represent path gains for the first and second links, respectively.

10. The method of claim 7, wherein:
the calculation of the respective scaling factors for the links is based on uplink buffer state for each link such that:

$$\alpha = \frac{RG_1}{RG_1 + RG_2};$$

and
$\beta = 1 - \alpha$; and
$RG_1$ and $RG_2$ represent total uplink resource grants for the first and second links, respectively.

11. The method of claim 10, further comprising receiving, from at least one of the wireless network access points, a parameter $\lambda$, and calculating the scaling factors $\alpha$ and $\beta$ according to:

$\alpha = \lambda$; and $\beta = 1 - \lambda$.

12. The method of claim 11, further comprising receiving, from at least one of the wireless network access points, the total uplink resource grants $RG_1$ and $RG_2$ for the first and second links, respectively.

13. The method of claim 7, wherein the calculation of the respective scaling factors for the links is based on priority for each link such that:
$\alpha = 1$, for the link having the higher priority; and $$\beta = \frac{P_{MAX} - P_1}{P_2},$$

for the other link.

14. A mobile terminal for controlling transmit power of the mobile terminal in dual connectivity mode wherein the mobile terminal is configured to support two or more contemporaneous links, including a first link and a second link, with two or more wireless network access points, the mobile terminal comprising:
one or more processing circuits configured to:
independently calculate respective unscaled uplink transmission power levels for the contemporaneous links, based on corresponding link-specific values;
calculate respective scaling factors for the contemporaneous links to satisfy a total-power constraint and to allocate respective power levels to the links in proportion with values that the links have for one or more criterions;
apply the respective scaling factors to the respective unscaled uplink transmission power levels, to obtain corresponding scaled power levels; and
a transmit circuit configured to transmit over the two or more contemporaneous links at the respective scaled power levels.

15. The mobile terminal of claim 14, wherein the one or more criterions comprise uplink resource allocation.

16. The mobile terminal of claim 14, wherein the one or more criterions comprise link quality.

17. The mobile terminal of claim 14, wherein the one or more criterions comprise uplink buffer state.

18. The mobile terminal of claim 14, wherein the one or more criterions comprise priority.

19. The mobile terminal of claim 14, wherein:
the two or more contemporaneous links are two contemporaneous links;
the respective unscaled uplink transmission power levels for the links comprises unscaled power levels $P_1$ and $P_2$ for the two contemporaneous links; and
the respective scaling factors for the links are corresponding scaling factors $\alpha$ and $\beta$ related to the unscaled power levels $P_1$ and $P_2$ according to the expression $\alpha P_1 + \beta P_2 \leq P_{MAX}$, where $P_{MAX}$ is the total-power constraint.

20. The mobile terminal of claim 19, wherein the unscaled power levels $P_1$ and $P_2$ for the two contemporaneous links are related to the corresponding scaling factors $\alpha$ and $\beta$ according to the expression $\alpha P_1 + \beta P_2 = P_{MAX}$.

21. A method for controlling transmit power of a mobile terminal, the method being performed by the mobile terminal in a dual connectivity mode wherein the mobile terminal is configured to support two or more contemporaneous links with two or more wireless network access points, the method comprising:
independently calculating a first unscaled uplink transmission power level for a first link and a second unscaled uplink transmission power level for a second link, based on corresponding link-specific values, the first and second links being included in said two or more contemporaneous links;

calculating a scaling factor for the second link to satisfy a total-power constraint and to allocate the first unscaled uplink transmission power level to the first link, the first link having a higher priority than the second link;

applying the calculated scaling factor to the second unscaled uplink transmission power level, to obtain a corresponding scaled power level for the second link; and transmitting over the first link at the first unscaled uplink transmission power level and over the second link at the corresponding scaled power level.

22. A mobile terminal for controlling transmit power of the mobile terminal in dual connectivity mode wherein the mobile terminal is configured to support two or more contemporaneous links with two or more wireless network access points, the mobile terminal comprising:

one or more processing circuits configured to:
independently calculate a first unscaled uplink transmission power level for a first link and a second unscaled uplink transmission power level for a second link, based on corresponding link-specific values, the first and second links being included in said two or more contemporaneous links;

calculate a scaling factor for the second link to satisfy a total-power constraint and to allocate the first unscaled uplink transmission power level to the first link, the first link having a higher priority than the second link;

apply the calculated scaling factor to the second unscaled uplink transmission power level, to obtain a corresponding scaled power level for the second link; and a transmit circuit configured to transmit over the first link at the first unscaled uplink transmission power level and over the second link at the corresponding scaled power level.

23. A method for controlling transmit power of a mobile terminal, the method being performed by the mobile terminal in a dual connectivity mode wherein the mobile terminal is configured to support two or more contemporaneous links with two or more wireless network access points, the method comprising:

independently calculating a first uplink transmission power level for a first link and a second uplink transmission power level for a second link, based on corresponding link-specific values, the first and second links being included in said two or more contemporaneous links; and when a sum of the first uplink transmission power level and the second uplink transmission power level does not satisfy a total-power constraint: determining an uplink transmission power level for the second link up to a remaining available power level to satisfy the total-power constraint while allocating the first uplink transmission power level to the first link, the first link having a higher priority than the second link; and transmitting over the first link at the first uplink transmission power level and over the second link at the determined uplink transmission power level.

24. The method of claim 23, wherein the remaining available power level is a difference between a maximum allowed power level for the mobile terminal and the first uplink transmission power level for the first link.

25. The method of claim 23, wherein the transmitting over the first link is based on single-carrier frequency-division multiple access (SC-FDMA).

26. The method of claim 23, wherein the first link is used by the mobile terminal for transmitting to a Long Term Evolution (LTE) network.

27. A mobile terminal for controlling transmit power of the mobile terminal in dual connectivity mode wherein the mobile terminal is configured to support two or more contemporaneous links with two or more wireless network access points, the mobile terminal comprising:

one or more processing circuits configured to:
independently calculate a first uplink transmission power level for a first link and a second uplink transmission power level for a second link, based on corresponding link-specific values, the first and second links being included in said two or more contemporaneous links; and when a sum of the first uplink transmission power level and the second uplink transmission power level does not satisfy a total-power constraint:
determine an uplink transmission power level for the second link up to a remaining available power level to satisfy a total-power constraint while allocating the first uplink transmission power level to the first link, the first link having a higher priority than the second link; and a transmit circuit configured to transmit over the first link at the first unscaled uplink transmission power level and over the second link at the determined uplink transmission power level.

28. The mobile terminal of claim 27, wherein the remaining available power level is a difference between a maximum allowed power level for the mobile terminal and the first uplink transmission power level for the first link.

29. The mobile terminal of claim 27, wherein the transmit circuit is further configured to transmit over the first link based on single-carrier frequency-division multiple access (SC-FDMA).

30. The method of claim 27, wherein the mobile terminal is configured to use the first link for transmitting to a Long Term Evolution (LTE) network.

* * * * *